(12) United States Patent
Schmitt

(10) Patent No.: US 6,582,801 B1
(45) Date of Patent: Jun. 24, 2003

(54) SIGNAGE WITH OPAQUE AND TRANSPARENT ELEMENTS AND METHOD OF MAKING THE SAME

(75) Inventor: Anthony J. Schmitt, Ballwin, MO (US)

(73) Assignee: Optima Graphics, Inc., Fenton, MI (US)

( * ) Notice: Subject to any disclaimer, the term of this patent is extended or adjusted under 35 U.S.C. 154(b) by 0 days.

(21) Appl. No.: 09/630,949

(22) Filed: Aug. 3, 2000

(51) Int. Cl.[7] .............................. B32B 3/00; B32B 31/00
(52) U.S. Cl. ........................ 428/195; 428/199; 428/200; 428/203; 428/207; 428/209; 428/461; 428/500; 428/913; 156/250; 156/257; 156/260; 156/263; 156/264; 156/265; 156/267; 156/268
(58) Field of Search ................................. 428/195, 187, 428/199, 200, 203, 204, 207, 412, 704, 209, 500, 461, 913; 156/250, 257, 260, 264, 263, 265, 267, 268

(56) References Cited

U.S. PATENT DOCUMENTS

| 4,440,590 A | 4/1984 | Collins et al. |
| 4,666,757 A | 5/1987 | Helinski |
| 4,900,611 A * | 2/1990 | Carroll, Jr. .................. 428/216 |
| 5,072,304 A | 12/1991 | Abe et al. |
| 5,144,328 A | 9/1992 | Blake et al. |
| 5,277,736 A | 1/1994 | Logan |
| 5,288,358 A | 2/1994 | Logan |
| 5,352,314 A | 10/1994 | Coplan |
| 5,686,170 A * | 11/1997 | Condon et al. ............. 428/207 |

* cited by examiner

Primary Examiner—Deborah Jones
Assistant Examiner—Ling Xu
(74) Attorney, Agent, or Firm—Polster, Lieder, Woodruff & Lucchesi

(57) ABSTRACT

An eye-catching bold sign and method of making same wherein the sign has a digital, near-photographic image applied, using a digital file, to a transparent polymeric substrate. The sign further incorporates solid block or defined shapes that may be transparent, translucent, semi-translucent, or opaque. The shapes are defined by the same digital file and may be formed by layers of metallic or non-metallic paint, adhesive vinyl sheet, or discreet portions of either paint or vinyl sheet. The shapes are defined by selective removal of areas of an opaque backing.

21 Claims, 3 Drawing Sheets

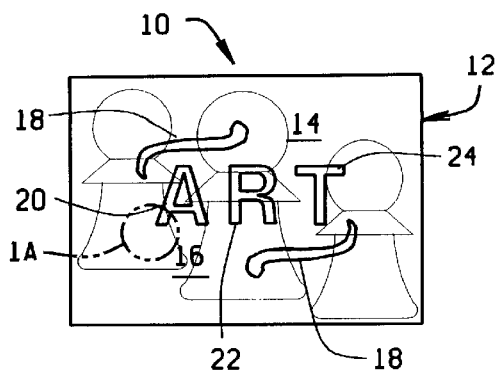
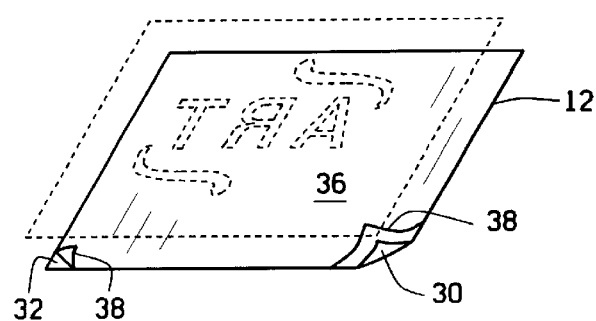
FIG. 1
FIG. 2
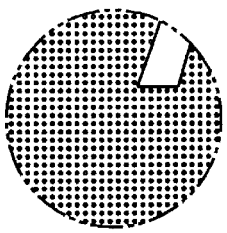
FIG. 1A
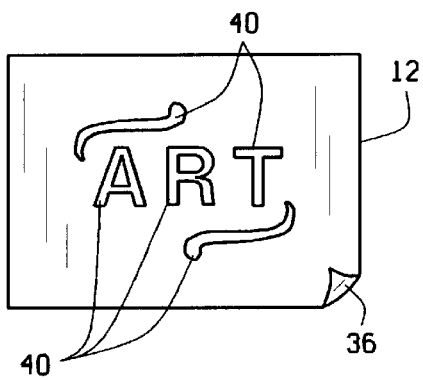
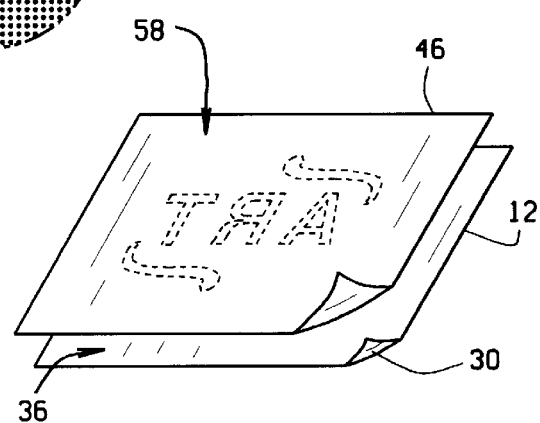
FIG. 3
FIG. 4
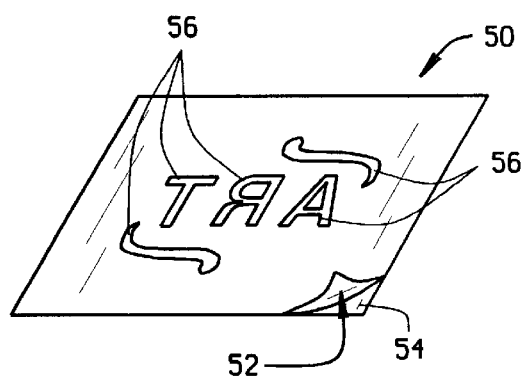
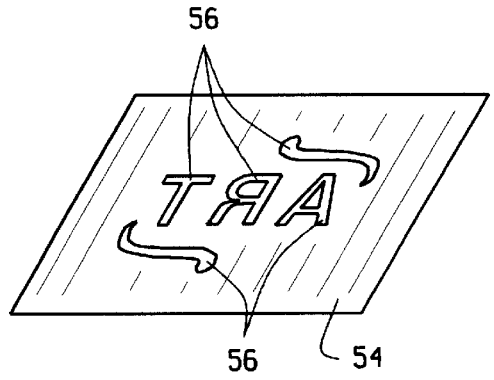
FIG. 5
FIG. 6

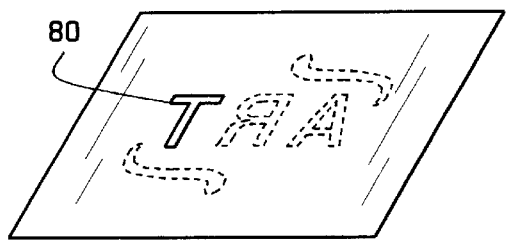
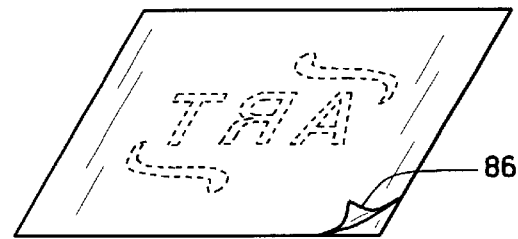
FIG. 13    FIG. 14
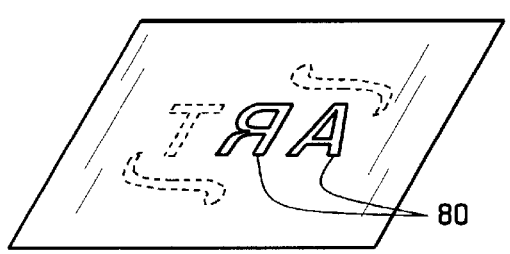
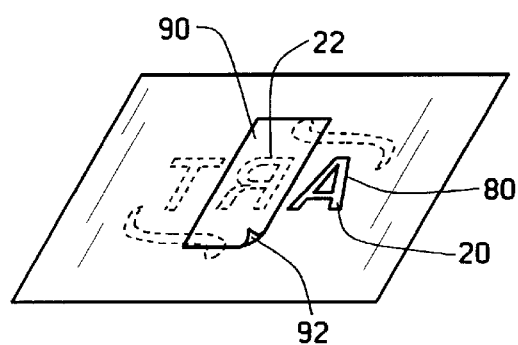
FIG. 15    FIG. 16

SIGNAGE WITH OPAQUE AND TRANSPARENT ELEMENTS AND METHOD OF MAKING THE SAME

CROSS-REFERENCE TO RELATED APPLICATIONS

None

STATEMENT REGARDING FEDERALLY SPONSORED RESEARCH OR DEVELOPMENT

Not Applicable.

BACKGROUND OF THE INVENTION

This invention relates to a sign or signage, and in particular to signage incorporating a transparent substrate with a graphic on its rear face, the graphic being viewed through the substrate.

It is well-known in the art to make a sign with a polymeric substrate such as, for example, a sheet of polycarbonate. This substrate is sufficiently transparent to enable a graphic placed on its rear face to be viewed through the substrate. Such signs are widely used indoors and outdoors. They may be backlighted, but they need not be.

One type of such signs is made by applying a near-photographic quality image to the substrate. Near-photographic quality signs are typically produced from a digital data file by applying the image as a series of dots or pixels in accordance with the data file. As used herein, near-photographic quality means that the viewer is presented with an image which, at a particular viewing distance, appears very similar to a photograph. In common usage for signs viewed at stores, displays, and tradeshows or the like, near-photographic quality images have at least one hundred thousand individual dots or pixels, more preferably at least one million or more pixels.

One method for applying such an image uses a transfer process, such as with a machine made by the Xerox Corporation, the 950 Series II. A second method uses an RGB laser such as a Lambda machine made by the Durst Company of Germany. A third method uses an electrostatic process. A fourth method uses an ink jet printer to apply an image. In applying a near-photographic image, a computer-based digital file is typically utilized which directs whatever process applies the pixels to create the image. Each of these is known in the art. Further known in the art is the method of applying ink films to a material, as disclosed in U.S. Patent Blake, et al., U.S. Pat. No. 5,144,328; Helinski, U.S. Pat. No. 4,666,757; and Abe, et al., U.S. Pat. No. 5,072,304; these being incorporated by reference herein.

The image is typically applied on a reverse side of a generally optically clear substrate, so as to be viewed through the substrate from the front side. In order for the image to adhere properly to the substrate, typically a coating is applied to the side of the substrate on which the image is placed. Once an image is applied to the substrate, the image is typically permanently affixed by a protective polymeric layer in the form of a sheet applied over the image, laminating the image between two layers of polymeric material. If the desired resulting sign is opaque, a solid white layer is first applied to the rear surface of the protective layer to balance the colors, and then an opaquing layer is applied, typically solid gray in color.

Such signs may capture minute detail, but the pigments used in applying the image typically lack eye-catching intensity and boldness.

An entirely different type of laminated polymeric sign is also known in the art, on which bold, eye-catching shapes, such as block letters or designs, of a contrasting material are affixed to the substrate. Signs and methods of making them using variations of this process are disclosed in U.S. Patent, Collins, et al., U.S. Pat. No. 4,440,590; Logan, U.S. Pat. No. 5,277,736; Logan, U.S. Pat. No. 5,288,358; and Coplan, U.S. Pat. No. 5,352,314, and are incorporated by reference herein.

In an example of making such signs, shapes are cut into a vinyl sheet with one side having a pressure-sensitive adhesive and a backing. This may be done by hand, by a computer-controlled X-Y plotter-cutter such as the Roland Digital Group CAMM-1, PNC-1850, or by any other method. In this method, cutting is done through the vinyl sheet without cutting through the backing. The sheet is then "weeded," that is, the portions of undesired vinyl are removed from the backing. Next, an adhesive tape, commonly referred to as transfer or application tape, is applied to the non-tack side of the remaining vinyl portions. The backing of the vinyl sheet is then removed, exposing the pressure-sensitive adhesive of both the desired vinyl portion and the transfer tape. Each vinyl shape remains properly aligned on the transfer tape.

In order to apply the desired vinyl portions to the sign substrate, typically water with a mild soap is sprayed onto the rear surface of the sign substrate. Both the transfer tape and desired portions are applied on top of the soapy water. The adhesive of both is able to partially adhere to the substrate despite the soap, though not very well. This allows the alignment of the vinyl pieces as a group to be adjusted. Once proper positioning of the group of pieces is achieved, the transfer tape and desired vinyl portions are held in place, typically both adhesively and manually, while the soapy water is squeegeed or pressed from between the substrate and the adhesives. After the water has been removed, the transfer tape is peeled from the substrate while the vinyl portions remain affixed to the substrate.

This second method may be modified to produce signs with different colored elements. For instance, the process may be repeated with a second, different colored sheet of vinyl. In addition, the sign may sprayed with a paint of a particular color, as well as a metallic color.

Signs made by this method are typically bold and eye-catching, but they lack fine details and nuanced design.

BRIEF SUMMARY OF THE INVENTION

One of the objects of the present invention is to provide a sign that is both detailed and eye-catching.

Another object is to provide methods of producing such a sign.

In accordance with one aspect of the present invention, generally stated, a sign is provided comprising a first transparent sheet, an image media layer applied to one side of the sheet, and an opaquing layer behind the image media layer, the opaquing layer comprising at least one blank portion defining at least one discrete non-opaque element. The term sheet is used broadly herein to include sheets of various thicknesses, from films to rigid sheets. Preferably, the transparent sheet is polymeric, but it may be glass or other material.

Preferably, the sign further comprises a white layer between the image media layer and the opaquing layer, the white layer including at least one opening corresponding to the discrete non-opaque element.

The preferred sign further comprises a translucent third polymeric sheet applied to the opaquing layer to protect that layer from abrasion or other damage and to give a bold, eye-catching appearance to the discrete non-opaque element or elements. Preferably, the third polymeric sheet applied is a continuous sheet of adhesive vinyl.

Preferably, the image media layer is a near-photographic quality image applied using a digital file. In the preferred embodiment, the near-photographic quality image is applied by a wide-carriage color ink-jet printer. Other well-known methods that could be utilized include digital photographic methods, direct electrostatic methods, and electrostatic transfer methods. The particular method of applying the image is not critical to the broader aspects of the invention, although it is preferred that the image be generated from a digital file. The image is preferably full color.

In the preferred embodiment and in accordance with another aspect of the invention, the at least one non-opaque element is shaped by a digital plotter and preferably corresponds to at least one pre-determined portion of the image media layer. It is preferred that the same, single digital file is used to apply the image media layer and to shape the at least one non-opaque element, although different portions of the file may be extracted and manipulated differently. Preferably, the sign further includes a plurality of non-opaque elements corresponding one-to-one to a plurality of pre-determined portions of the image media layer.

In one embodiment, at least one of the non-opaque elements is covered with metallic paint. It will be seen that in some instances the metallic paint will be opaque and will render opaque the non-opaque element of the completed sign. It will also be seen that in other instances the metallic paint may be non-opaque. In another embodiment, at least one of the non-opaque elements is covered with a translucent layer and preferably the translucent layer is an adhesive vinyl sheet. In another embodiment, a plurality of the non-opaque elements are covered with a translucent layer, at least one of which is further covered with a second translucent layer. The second translucent layer is white. The non-opaque elements generally correspond to portions of the image media layer which are intended to be emphasized. Illustrative of such elements are letters, numbers, logos, lighted elements, such as windows or streetlights, or product images. The discrete elements may also be image elements such as colors or textures that cannot be applied by the image media layer applicator, e.g., an ink jet printer.

In accordance with a second aspect of the present invention, generally stated, a method of making a sign is provided, the steps comprising applying an image media layer to a first transparent sheet; and applying an opaquing layer behind the image media layer, the opaquing layer comprising at least one blank portion defining at least one discrete non-opaque element. Preferably, the method includes applying a second polymeric sheet to the image media layer. Preferably, the method includes applying a white layer behind the image media layer before applying the opaquing layer. In one embodiment, the method further includes applying a translucent layer to at least one non-opaque element. In a further embodiment, the method includes applying a layer of metallic paint to at least one non-opaque element.

In accordance with another aspect of the invention, the method includes applying a near photographic quality image media layer, using a digital file, to the first transparent polymeric sheet and applying a first adhesive sheet material shaped by a digital plotter and the digital file as to correspond to predetermined portions of the image media layer. Preferably, the method further comprises applying an opaquing layer to the image media layer and semi-translucent material, and removing at least a portion of the semi-translucent material to define non-opaque elements. In a further embodiment, this method further includes applying a semi-translucent layer generally white in color to the adhesive semi-translucent material and to the image media layer and includes applying the opaquing layer to the semi-translucent layer generally white in color. In one embodiment, the method further comprises applying a second semi-translucent material to the opaquing layer and the non-opaque elements. In another embodiment, the method includes applying metallic paint to the non-opaque elements. In another embodiment, the method includes applying a second transparent polymeric sheet to the image media layer; and applying a first adhesive semi-translucent material to the second transparent polymeric sheet, the material shaped by a digital plotter and the digital file to correspond to predetermined portions of the image media layer.

In accordance with another aspect of the present invention, a method of making a sign is disclosed, the steps including applying a near photographic quality image media layer using a digital file to a first transparent polymeric sheet, applying a second transparent polymeric sheet to the image media layer, spraying the second transparent polymeric sheet with an adhesive retarding fluid, applying a first adhesive semi-translucent material to the sprayed second transparent polymeric sheet so as to correspond to predetermined portions of the image media layer, the material being shaped by a digital plotter and the digital file, squeegeeing the fluid from between the semi-translucent material and the polymeric sheet, applying an opaquing layer to the first adhesive semi-translucent material and the second transparent polymeric sheet, and removing at least a portion of the first adhesive semi-translucent material so as to define non-opaque elements. In one embodiment, the method includes applying a layer of metallic paint to at least one non-opaque element. In another embodiment, the method includes applying a second adhesive semi-translucent material to at least one non-opaque element. This method preferably includes applying a semi-translucent layer generally white in color to the first adhesive semi-translucent material and the second transparent polymeric sheet.

Other aspects of the invention will become apparent in view of the following description and claims.

BRIEF DESCRIPTION OF THE SEVERAL VIEWS OF THE DRAWINGS

In the drawings, FIG. 1 is a front plan view of a sign made in accordance with the present invention;

FIG. 1A is an enlarged view of the section of the sign of FIG. 1 labeled as A;

FIG. 2 is a rear perspective view of a polymeric substrate and an applied image illustrating a first step in making the sign of FIG. 1;

FIG. 3 is a front plan view of the polymeric substrate and applied image of FIG. 2;

FIG. 4 is a rear perspective view of the polymeric substrate and applied image of FIGS. 2 and 3, with a laminate being applied;

FIG. 5 is a front perspective view of a sheet of adhesive polymeric sheet with selected shapes cut into the sheet for use in forming the sign of FIG. 1;

FIG. 6 is a front perspective view of a weeded sheet of the adhesive polymeric sheet of FIG. 5 showing the backing of the sheet;

FIG. 13 is a rear perspective view of the polymeric substrate of FIG. 12 with a selected portion of the selected shapes removed;

FIG. 14 is a rear perspective view of the polymeric substrate of FIG. 13 with an additional layer of paint;

FIG. 15 is a rear perspective view of the polymeric substrate of FIG. 14 with additional selected portions of the selected shapes removed; and FIG. 16 is a rear perspective view of the polymeric substrate of FIG. 15 with an additional polymeric sheet being applied.

Corresponding reference numerals will be used throughout the several figures of the drawings.

DETAILED DESCRIPTION OF THE PREFERRED EMBODIMENTS

Figure 7:
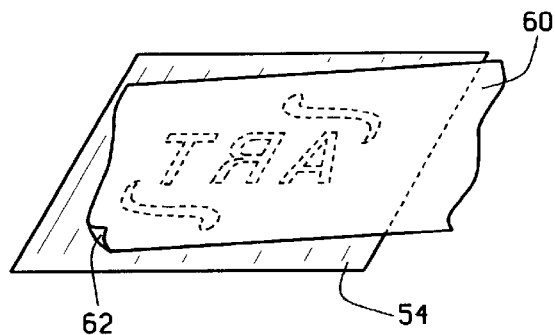
FIG. 7 is a front perspective view of the sheet of FIG. 6 with transfer tape applied.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Referring initially to FIG. 1, a sign 10 of the present invention is depicted. The sign 10 is permanent and formed of a generally transparent polymeric substrate 12, preferably polycarbonate with a thickness of 8–10 mils. The sign 10 presents to an observer an image 14, generally extending to the boundaries of the substrate 12, which may incorporate one or more of some or all of the following: an opaque media image 16 (represented by the area depicting several items and representing a digital image extending to the boundaries of the substrate 12 in this FIG. 1 only); opaque design area 18; a generally transparent design area 20; a generally translucent design area 22; and a painted design area 24.

Referring now to FIG. 2, the substrate 12 is depicted. The substrate 12 has a front side 30 presented to the viewer and a back side.32. Applied to the back side 32 of the substrate 12 is an image media layer 36, specific details of which are depicted with a dashed line. The image media layer 36 is near-photographic quality, preferably applied by an ink jet printer so as to be ink dots resulting in a generally transparent or translucent image. The image media layer 36 is a digitized image contained in a digital file applied by a computer-controlled apparatus. In order to maximize the adherence of the image media layer 36, a coating 38 is applied to the substrate 12 during its manufacturing process. One example of the preferred substrate 12 and coating 38 is available under the tradename Lexjet.

As depicted in FIG. 2, the image media layer 36 is typically applied to the substrate 12 in the reverse of the desired image presented to a viewer as to be viewed through the substrate 12. Referring now to FIG. 3, the substrate 12 is shown from the viewer's perspective with the image media layer 36 visible through the substrate 12. The image media layer 36 contains image details or designs 40. These image designs 40 may be places where no image media layer 36 was applied to the substrate 12, or may be portions of the image media layer 36 which are of particular interest.

The image media layer 36 is preferably protected from contact or abrasion. Accordingly, as depicted in FIG. 4, a generally transparent laminate 46 is applied onto the image media layer 36. The laminate 46 may be applied through a number of processes, such as using pressure-sensitive adhesive or using a heat process.

FIG. 5 shows a polymeric sheet 50 of a particular color C, one side of which has a high-tack adhesive 52 covered with a backing 54. The polymeric sheet 50 is preferably made of vinyl. As the image media layer 36 was applied to the substrate 12 from a digital file, the same digital file is used to cut sheet designs 56 into the polymeric sheet 50, the polymeric sheet preferably being cut by an X-Y plotter-cutter as discussed above as to cut the vinyl but not the backing 54. Thus, the backing 54 remains adhered to both the desired sheet designs 56 and the undesired portion of the polymeric sheet 50. The sheet designs 56 are cut in the reverse so as to correspond to the laminate back side 58 (FIG. 4).

The polymeric sheet 50 is then weeded. By weeding, the undesired portion of the polymeric sheet 50 is removed while the desired sheet designs 56 remain adhered to the backing and remain properly aligned with respect to each other. As can be seen in FIG. 6, the desired sheet designs 56 are depicted adhered to the backing 54.

Figure 8:
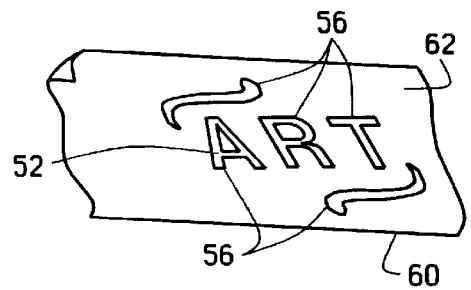
FIG. 8 is a is a plan view of the transfer tape of FIG. 7 and selected cut shapes of FIG. 5.

As shown in FIG. 7, a masking-type tape, commonly referred to as transfer or application tape 60 with a low-tack adhesive 62, is applied as to cover the sheet designs 56. The backing 54 is then peeled away from the transfer tape 60, exposing the adhesive side 52 of the sheet designs 56 and the tape adhesive 62, as is shown in FIG. 8.

Figure 9:
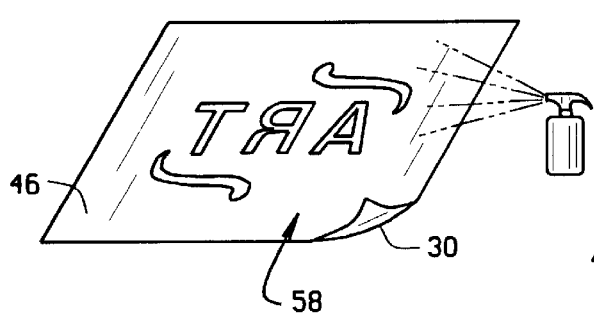
FIG. 9 is a is a rear perspective view of the polymeric substrate of FIG. 1 with an applied image being sprayed with a tack-retardant fluid.

The adhesive side 52 of the sheet designs 56 is of a higher-tack than the tape adhesive 62. The placing of the sheet designs 56 on the laminate 46 is typically done manually and needs to allow slight manual shifting of the sheet designs 56 before adherence is permanent. To facilitate this manual shifting, the laminate back side 58 is prepared first by spraying a thin layer of tack-retarding liquid, preferably water with a dissolved mild soap, to the back side 58 of the laminate 46, as depicted in FIG. 9. If the laminate 46 is not present, the tack-retarding liquid may be sprayed directly onto the image media layer 36. As is obvious, if the laminate 46 is not present and the image media layer 36 is water soluble ink, the tack retarding liquid should not be sprayed on the image media layer 36.

Figure 10:
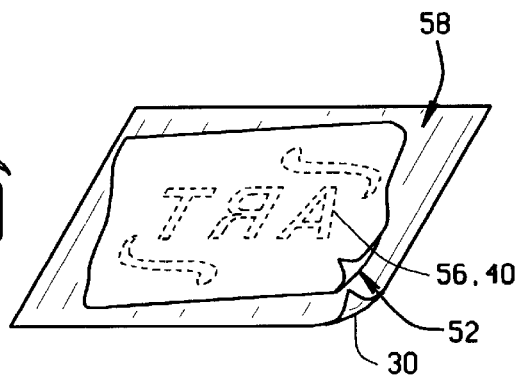
FIG. 10 is a rear perspective view of the polymeric substrate of FIG. 9 with the transfer tape of FIG. 8 being applied.
Figure 11:
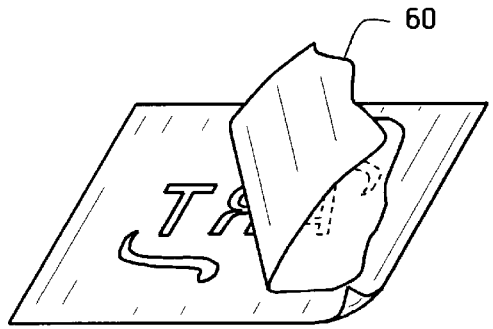
FIG. 11 is a rear perspective view of the polymeric substrate of FIG. 10 with transfer tape being removed.

Referring to FIG. 10, the adhesive side 52 of the sheet designs 56 and the tape adhesive 62 are placed against the back side 58 of the laminate 46, and the sheet designs 56 are properly aligned with the image designs 40. Once the alignments is completed, adherence is strengthened between the sheet designs 56 and the laminate 46 by pressing them together. The soapy water mixture is then squeegeed out from underneath the transfer tape 60. During this squeegeeing, one may desire to manually hold the transfer tape 60 firmly in place. Once the soapy water has been removed, the transfer tape 60 is peeled off, as is shown in FIG. 11.

As noted above, the tape adhesive 62 of the transfer tape 60 has a lower tack than the adhesive side 52 of the sheet designs 56. The soapy water acts as a tack-retarding fluid, hindering the adhesion of both the adhesive side 52 and the tape adhesive 62 allowing these to be properly positioned without adhering strongly until after the soapy water is squeegeed. Once the water has been squeegeed, the transfer tape 60 may be peeled away. Because of the tack of the transfer tape 60 is lower than the adhesive side 52, the sheet designs remain affixed to the laminate 46.

Figure 12:
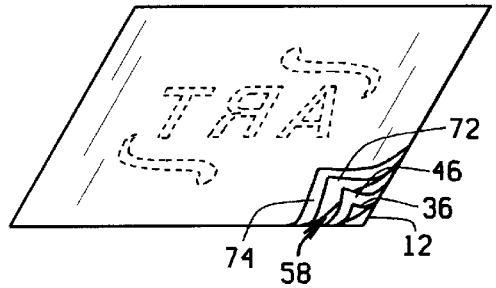
FIG. 12 is a rear perspective view of the polymeric substrate of FIG. 11 with two layers of paint.

As the image media layer 36 is generally transparent or translucent, the colors are not balanced, instead varying depending on the backdrop or lighting. Accordingly, as is shown in FIG. 12, a solid white layer 72 is applied to the back side 58 of the laminate 46. This white layer 72 allows the colors of the image media layer 36 to be properly perceived by a viewer. Next, an opaquing layer 74 is applied to the white layer 72. Typically and preferably, the opaquing layer 74 is a solid gray color.

Both the white layer 72 and the opaquing layer 74 are made of a paint or the like which is easily torn as to produce a sharp and predictable edge. The sheet designs 56, by virtue of their thickness, are raised portions and are readily located. The above-mentioned opaque media image 16 (FIG. 1) is the portion of the image media layer 36 which received the white layer 72 and opaquing layer 74 directly without being separated by the sheet designs 56.

Referring now to FIG. 13, the next step is peeling one or more of the sheet designs 56 to leave a blank portion or opening 80 where the laminate 46 is visible from the back side of the opaquing layer. As mentioned above, the sign 10 may have opaque design areas 18, transparent design areas 20, translucent design areas 22, and painted design areas 24. By adding the opaquing layer 74, any sheet design 56 that is not peeled will result in an opaque design area 18. The transparent design areas 20, translucent design areas 22, and painted design areas 24 are formed from the blank portions or openings 80 in the opaquing layer 74 as described below. It may be noted that the blank portion or opening is sometimes referred to herein as a "discrete non-opaque element" although when painted it may become opaque.

If painted design areas 24 are desired, for instance metallic painted areas, these are preferably applied next by spraying a paint layer 86 (FIG. 14). Only the sheet designs 56 corresponding to where the paint layer 86 is to be applied should be peeled prior to spraying the paint layer 86. For each color or type of paint desired, this process is preferably repeated by peeling only specific sheet designs 56 that are to be covered by a particular color immediately prior to spraying the particular color.

To create both transparent design areas 20 and translucent design areas 22, the sheet designs 56 corresponding to these areas are peeled forming blank portions 80, as depicted in FIG. 15. As further depicted in FIG. 16, a translucent design area 22 is created by applying a second polymeric sheet 90, preferably vinyl with an adhesive side 92, over a blank portion 80 (FIG. 15). A transparent area 20, as shown in FIG. 16, is created simply by peeling the corresponding sheet design 56, leaving a blank portion 80.

In an alternative embodiment, opaque design areas 18 of various colors may be created. This can be achieved by repeating the steps necessary to apply the sheet design in one color with a different colored polymeric sheet 50. As there are several steps involved in this, there are further a number of permutations and combinations that could be created. Multiple paint colors could be applied, sheet designs 56 being peeled up for each specific color. Multiple colors for translucent design areas 22 may be achieved by sequentially applying multiple pieces of colored polymeric sheet. These variations are merely illustrative.

In another alternative embodiment, a semi-translucent final layer (not shown) may be added. This final layer may be affixed as to cover the entire back side of the sign 10 as a finishing step. Preferably, the final layer is white, and, preferably, it is a adhesive vinyl sheet. The purpose of the final layer is to protect the sign and to insure proper color balance. Furthermore, as one may desire for any portions of the sign 10 which would otherwise be transparent design areas 20 to allow light to pass through, the final layer being semi-translucent serves to diffuse the light creating an even passage of light through the otherwise transparent design area 20.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A sign comprising:
    a first transparent sheet;
    an image media layer applied to one side of the sheet, the image media layer being a near-photographic quality image comprising at least one hundred thousand pixels;
    an opaquing layer behind the image media layer;
    a white layer between the image media layer and the opaquing layer; and
    at least one opening extending through the opaquing layer and the white layer, the opening defining a at least one discrete element.

2. The sign of claim 1 wherein the transparent sheet is polymeric.

3. The sign of claim 1 wherein the sign further comprises a second transparent polymeric sheet applied to the image media layer between the image media layer and the opaquing layer.

4. The sign of claim 1 wherein the image media layer comprises ink dots.

5. The sign of claim 1 wherein the at least one element corresponds to at least one portion of the image media layer.

6. The sign of claim 1 wherein the sign comprises a plurality of elements corresponding one-to-one to a plurality of portions of the image media layer.

7. The sign of claim 6 wherein at least one of the elements is covered with metallic paint.

8. The sign of claim 7 wherein the metallic paint is opaque and renders opaque the element or elements to which the paint is applied.

9. The sign of claim 6 wherein at least one of the elements is covered with a translucent layer.

10. The sign of claim 9 wherein the translucent layer is an adhesive vinyl sheet.

11. A method of making a sign comprising:
    applying an image media layer to a first transparent sheet, the image media layer being a near-photographic quality image comprising at least one hundred thousand pixels;
    applying a white layer behind the image media layer;
    applying an opaquing layer behind the white layer; and
    forming at least one opening extending through the opaquing layer and the white layer, the opening defining a at least one discrete element.

12. The method of claim 11 wherein forming at least one opening follows applying the white layer and the opaquing layer.

13. The method of claim 11 including applying a translucent layer to said at least one element.

14. The method of claim 11 including applying a layer of metallic paint to said at least one element.

15. The method of claim 11 including applying a second polymeric sheet to said image media layer before applying said white layer.

16. The method of claim 12 including applying a flexible sheet design behind at least one portion of the image media layer before applying the white layer and the opaquing layer, and after applying the white layer and the opaquing layer, peeling the flexible sheet design to remove at least one portion of the white layer and the opaquing layer, thereby producing the at least one discrete element.

17. The method of claim 16 further including cutting the flexible sheet design from sheet material using a digital plotter before applying the flexible sheet design.

18. The method of claim 17 wherein said near-photographic quality image is formed from a digital file before applying the flexible sheet design.

19. The method of claim 18 wherein a single digital file is used for applying the image media layer and for cutting the flexible sheet design.

20. The method of claim 19 wherein a plurality of discrete elements are formed, the elements corresponding one-to-one to a plurality of pre-determined portions of the image media layer.

21. The method of claim 11 wherein a plurality of discrete elements are formed, the elements corresponding one-to-one to a plurality of pre-determined portions of the image media layer.

\* \* \* \* \*

UNITED STATES PATENT AND TRADEMARK OFFICE
CERTIFICATE OF CORRECTION

PATENT NO. : 6,582,801 B1
DATED : June 24, 2003
INVENTOR(S) : Anthony J. Schmitt It is certified that error appears in the above-identified patent and that said Letters Patent is hereby corrected as shown below:

Title page,
Item [73], Assignee, "Fenton, MI", should read -- Fenton, MO --.

Signed and Sealed this

Twenty-ninth Day of November, 2005

JON W. DUDAS
*Director of the United States Patent and Trademark Office*